No. 878,821. PATENTED FEB. 11, 1908.
C. K. McCASLAND.
PLOW.
APPLICATION FILED MAY 17, 1907.
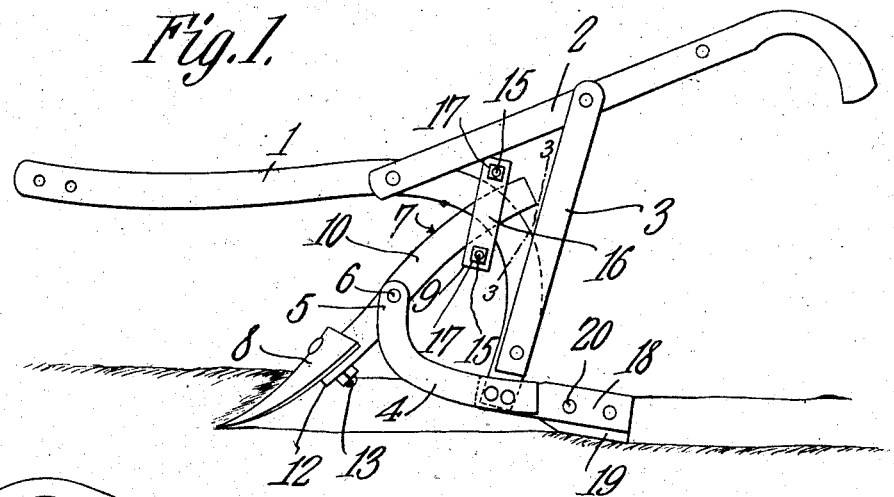
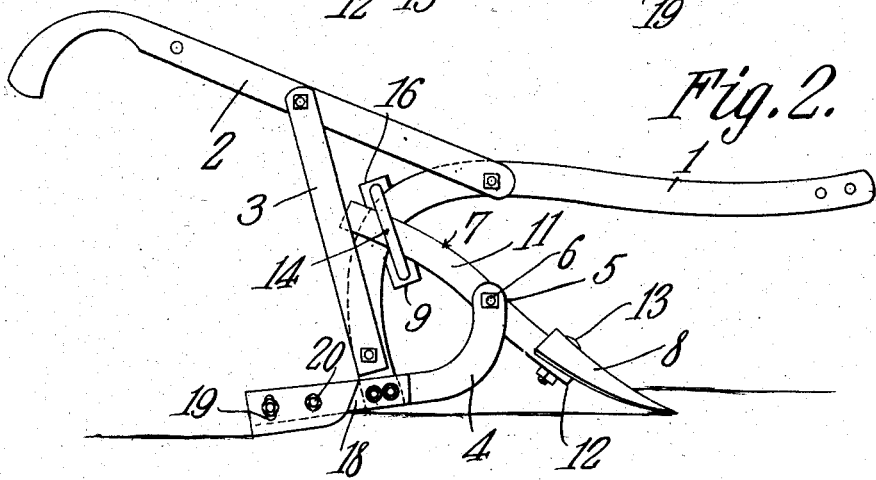
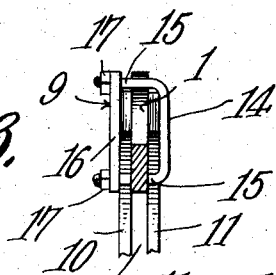
Charles H. McCasland,
INVENTOR.
WITNESSES:
By C. A. Snow & Co.
ATTORNEYS

UNITED STATES PATENT OFFICE.

CHARLES K. McCASLAND, OF ALVARADO, TEXAS.

PLOW.

No. 878,821.　　　Specification of Letters Patent.　　　Patented Feb. 11, 1908.

Application filed May 17, 1907. Serial No. 374,183.

*To all whom it may concern:*

Be it known that I, CHARLES K. McCASLAND, a citizen of the United States, residing at Alvarado, in the county of Johnson and State of Texas, have invented a new and useful Plow, of which the following is a specification.

This invention relates to a plow, and has for its prime object a simple and convenient means for adjusting the moldboard to cause the plow to turn a deep or shallow furrow as desired.

A further object of the invention is to provide the plow with a cutter or knife to follow in the furrow and enter the ground at the bottom of the furrow for guiding the plow and causing it to run true and with great steadiness.

In the accompanying drawing: Figure 1 is a view in elevation of one side of the improved plow. Fig. 2 is a similar view of the opposite side. Fig. 3 is a cross section on the line 3—3 of Fig. 1.

Similar numerals of reference are used on all the figures to indicate the same parts.

The plow beam 1, preferably made of metal and in the usual form, has bolted to it the handles 2, firmly held in place by braces 3 extending from said handles, about midway of their length, to near the lower end of the plow beam 1 near the ground. Rigidly bolted to each side of the plow beam below the braces 3 is a forwardly projecting arm 4, said arms being parallel and turned upwardly at their forward ends. Between the extreme ends 5 of the arms 4 and pivoted thereon by a bolt 6, is the standard 7, carrying on its lower end a moldboard 8 of any required pattern.

The standard 7 extends upwardly with a slight curve above, for a short distance and on each side of the beam 1 and is attached thereto by a clamp 9 which will be loosened when the moldboard is to be adjusted. The standard is preferably made of two parallel bars 10 and 11, one on each side of the beam, and may consist of a single bar bent upon itself at 12 or of two individual bars. When a single bar is used the bolt 13 for attaching the moldboard to the standard passes through the folded part as represented in Figs. 1 and 2.

The clamp 9 may be of any approved form, but that shown in the drawing is a simple and efficient one and is preferred. This clamp comprises a bow 14 with parallel arms 15 embracing one side of the plow beam 1 and the standard bar 11, while on the opposite side of the beam is a yoke plate 16, bearing against the other standard bar 10. The bow 14 and the yoke plate 16 are held together by nuts 17 screwed on the threaded arms 15 which extend through holes in the yoke plate.

Fastened by the same bolts that secure the arms 4 to the beam 1 is a rearwardly extending limb 18 having a downward trend which carries an adjustable knife or cutter 19 pivoted thereon at 20 and held in position by a bolt 21 extending through a slot 22 in the cutter, an arrangement which enables the cutter to be raised and lowered and fastened securely to the limb.

The plow may be quickly adjusted to cut shallow or deep by loosening the nuts 17 of the clamp and moving the moldboard 8 towards or away from the beam 1, and when the proper position has been obtained, tightening the nuts. The limb to which the cutter is fastened is placed at such an angle that the knife or guide, whatever the position of the moldboard, will always cut into the ground and make the plow move more steadily than it would otherwise do.

Having thus described the invention what is claimed is:—

A plow comprising a beam having a downwardly curved rear extremity, an arm rigidly bolted to the lower end of said plow beam and extending forwardly and upwardly in a curve, a mold board standard pivoted to the free end of said arm and extending rearwardly across the plow beam, an adjustable clamp for holding said standard in any position on said beam to which it may be moved, a limb fixed to the lower end of the beam and extending rearwardly in line with the bottom of said arm, and a cutter pivoted on said limb and having a slot for a fastening bolt.

In testimony that I claim the foregoing as my own, I have hereto affixed my signature in the presence of two witnesses.

his
　　CHARLES K. × McCASLAND.
　　　　　　　　　　　　　　mark

Witnesses:
　　L. R. CHOATE,
　　L. H. MOORE.